(12) United States Patent
Fletcher et al.

(10) Patent No.: US 6,363,477 B1
(45) Date of Patent: Mar. 26, 2002

(54) METHOD FOR ANALYZING NETWORK APPLICATION FLOWS IN AN ENCRYPTED ENVIRONMENT

(75) Inventors: Richard A. Fletcher, San Jose; Carl Lin, Campbell, both of CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/143,273

(22) Filed: Aug. 28, 1998

(51) Int. Cl.[7] .................................................. H04F 9/00
(52) U.S. Cl. ........................ 713/151; 713/152; 713/153; 713/201; 709/223; 709/224
(58) Field of Search ................................ 709/223–226, 709/235; 702/182–185, 187–188; 714/4; 370/241–245, 252–253; 713/200–201, 151–153

(56) References Cited

U.S. PATENT DOCUMENTS

| | | | |
|---|---|---|---|
| 5,636,371 A | * 6/1997 | Yu | 703/26 |
| 5,706,437 A | * 1/1998 | Kirchner et al. | 709/203 |
| 6,041,352 A | * 3/2000 | Burdick et al. | 709/224 |
| 6,131,163 A | * 10/2000 | Wiegel | 713/201 |

* cited by examiner

*Primary Examiner*—Norman M. Wright
*Assistant Examiner*—Ho S. Song

(74) *Attorney, Agent, or Firm*—Wagner Murabito & Hao LLP

(57) ABSTRACT

In a communication network having computer systems communicatively coupled to each other with communication equipment, where the computer systems are executing network applications that send and receive either encrypted or unencrypted data packets over the communication network, a method for quantifying performance of the communication network. In one embodiment, between an application program interface and a protocol stack in a computer system, where the application program interface resides in an application layer of the computer system and the protocol stack resides in a kernel layer of the computer system, the present invention executes a process for identifying a network application, where the network application originates a request data packet and a response data packet. Second, in this embodiment the present invention records time-stamps when the request data packet and the response data packet are between the application program interface and the protocol stack in the computer system. Third, in this embodiment the present invention computes a difference between a first time-stamp and a second time-stamp. In this embodiment, the present invention next calculates performance statistics measured on the difference and stores the performance statistics in a memory unit of the computer system, where the memory unit is read-accessible and write-accessible from both the application layer and the kernel layer of the computer system. Finally, in this embodiment of the present invention, the computer system reports the performance statistics to a central computer system.

15 Claims, 15 Drawing Sheets

| NAME | APPLICATION | DIRECTION | NUMBER | CRITERIA | OPERATION | ACTION | MATCH COUNT |
|---|---|---|---|---|---|---|---|
| ARTFtp1 | Ftp.exe | LSPOut | 1 | {0,4, "RETR"} | NULL | RECORD TIME | 2 |
| ARTHttp1 | iexplore.exe | LSPIn | 2 | {9,3, "200"} | AND | RECORD TIME | 6 |
| | | | | {13,2, "OK"} | | | |

METHOD FOR ANALYZING NETWORK APPLICATION FLOWS IN AN ENCRYPTED ENVIRONMENT

TECHNICAL FIELD

The present invention relates to the field of computer system communication networks. In particular, the present invention pertains to network monitoring and management.

BACKGROUND ART

Computer systems linked to each other in a communication network are commonly used in businesses and like organizations. Computer system communication networks ("networks") are growing in size—as measured by the number of applications and the number of users they support—due to improvements in network reliability and the recognition of associated benefits such as increased productivity.

As the size of networks increases and as organizations become more reliant on such networks, the importance of effective network management tools also grows. In response to the need for standardization of such tools, primarily to control costs but also because components in a network are likely to originate from many different vendors, the Simple Network Management Protocol (SNMP) was developed and widely adopted. Since implementation of SNMP, a supplement to SNMP known as Remote Network Monitoring (RMON) has been issued, and RMON has been subsequently extended with an addition known as RMON2. RMON and RMON2 provide SNMP with the capability for remote network monitoring; that is, a network manager is able to monitor network performance from a central computer system that has access to other components on the network, referred to as RMON probes, that monitor local areas of the network.

SNMP, RMON and RMON2 thus are network management software tools that provide a set of standards for network management and control, including a standard protocol, a specification for database structure, and a set of data objects. SNMP, RMON and RMON2 are implemented in a network through management information bases (MIBs) which contain instructions specifying the data that are to be collected, how the data are to be identified, and other information pertinent to the purpose of network monitoring. The MIBs are implemented through the RMON probes to monitor the local areas of the network.

Network managers use the SNMP, RMON and RMON2 standards to collect information regarding the performance of the network. By collecting information about network performance and analyzing it, the network manager is able to recognize situations indicating that either a problem is present or impending.

For example, the network manager (or any of the network users, for that matter) may be interested in obtaining performance statistics such as the average and worst-case performance times and the reliability of the network for a particular network application. Such applications generally describe a transaction between a user that is accessing the network through a client computer system and a server computer system that responds to the client computer system with the requested information. Network managers need performance statistics to help them manage and maintain the network and to plan for network improvements. For example, performance statistics can be used to recognize bottlenecks in the network before they cause problems so that corrective action can be taken. If the performance statistics indicate a growing load in one area of the network, network traffic (in the form of data packets that travel through the network's communication equipment) can be routed along a different path. Statistics accumulated over a longer period of time can be used to help decide whether it is necessary to expand particular areas of the network.

Performance statistics are also necessary for businesses and the like to determine whether the network support provided by a vendor of network management services is satisfactory or not. Many businesses contract with vendors for network management services. Such contracts are typically implemented with service level agreements (SLAs) which specify metrics against which the provider of the network management services is measured. These metrics are used to quantify standards of performance that allow businesses to assess not only the performance of the network but also the performance of the network management services provider. SLAs generally include a provision specifying metrics for performance time for critical network applications, where performance time, for example, is considered to be the amount of time between the time a user submits a request via the network and the time until the response to that request is received by the user. An effective network management tool should therefore provide a means for monitoring the network and gathering performance statistics for comparison against the requirements contained in the SLAs. However, as will be seen in the discussion below, the network management tools in the prior art do not provide a ready means of demonstrating compliance with SLAs.

Prior art network management tools have trouble aiding the network manager in determining whether a problem within the network is associated with the network or with the system hardware supporting the network, so that the network manager can identify and implement the appropriate corrective action. For example, if a user places a request for a particular network application to a server computer and a response is not received, the prior art network management tools do not generally identify whether the problem is occurring because of a bottleneck in the network or because the server is not functioning. Therefore, as will be seen in the discussion to follow, the network management tools in the prior art do not provide a ready means of monitoring performance of the entire network so that problems can be quickly detected.

With reference to FIG. 1, a prior art method used for network monitoring is illustrated for a simplified network 100. Network 100 is typically comprised of a plurality of client computer systems 110a, 110b and 110c networked with a number of different servers 130a, 130b and 130c. For this discussion, the focus is on client computer system 110c connected via communication lines 120 and 122 to server computer system 130c. Data packets (not shown) from client computer system 110c travel to server computer system 130c and back on either of communication lines 120 and 122, depending on the amount of traffic present on those lines due to simultaneous communications between client computer systems 110a and 110b and server computer systems 130a, 130b and 130c. The request data packets issued from client computer system 110c contain data that specify the address of client computer system 110c and the address of destination server computer system 130c, as well as other data pertinent to the network application being used, such as data defining the request being made. The response data packets issued from server computer system 130c also contain the sender and destination address as well as other data needed to respond to the request.

With reference still to FIG. 1, coupled into communication lines 120 and 122 are other communications equipment such as switches 124 and 125 and routers 126 and 127. Also on communication lines 120 and 122 are RMON probes 140 and 142 (the term "RMON" refers to both RMON and RMON2). An RMON probe typically operates in a promiscuous mode, observing every data packet that passes only through the communication line to which it is coupled.

RMON MIBs provide the capability to define filters that can be used to limit the number of data packets observed by an RMON probe that are to be captured or counted. Filters are specified using known RMON MIBs and are based on the type of data packet or other packet characteristics associated with the data contained within the data packet. Filters permit the RMON probe to screen observed data packets on the basis of recognition characteristics specified by the filter. Data packets are captured or counted by the RMON probe on the basis of a match (or a failure to match) with the specified recognition characteristics. Filters can be combined using logical "and" and "or" operations to define a more complex filter to be applied to data packets, thus focusing the screen onto a narrower group of data packets. Filters are widely used for network management because of the flexibility for defining the type of data packets to be captured and monitored, thus preferentially limiting the number of data packets captured by an RMON probe to the particular types of data packets of interest. Filters permit the data packets to be sorted by their type or contents, such as by the type of network application being performed, thereby achieving more discrete and meaningful performance statistics than might be achievable without the use of filters.

However, RMON relies on standard and established methods of identification, such as port identification numbers, to identify a network application contained within a data packet. This is problematic in the prior art because a significant portion of network applications do not use a standard and established port identification number, while other network applications use a port identification that is identical to that of another network application. Thus, in the prior art, it is not possible to identify a network application in a significant amount of the instances where it is necessary to do so in order to collect meaningful and helpful performance statistics.

In addition, the prior art relies on information included in data packets being transmitted "in the clear;" that is, the information is riot encrypted and can be intercepted and read by anyone with access to the network in which the data packet is transmitted. However, as a means of increasing the security of information transmitted in networks, businesses and network services providers are finding it increasingly desirable to encrypt the information contained in the data packet so that it can only be read by an authorized person with access to the encryption process. However, in the prior art, information in the data packet cannot be deciphered by RMON filters when that information is encrypted. Thus, a disadvantage to the prior art is that when a data packet is encrypted, filters cannot read the data packets, so that data packets cannot be recognized and sorted. Thus, in the prior art, information that would be useful to the network manager to permit interpretation of performance statistics is not available for encrypted data packets. It is also not possible to correlate request and response packets; consequently, performance times cannot be measured and conformance to the SLA cannot be demonstrated. Finally, with the use of encrypted data packets, in the prior art it is not possible to differentiate a data packet for one network application from a data packet for another network application. This information may be useful to the network manager for interpreting performance statistics, and it is also needed to prioritize applications being run on a network in accordance with the prioritization standards established by the Institute of Electrical and Electronics Engineers (IEEE) and the Internet Engineering Task Force (IETF).

Packet monitoring using probes (as shown in FIG. 1) is also problematic when data switching is used in network 100. Assume a user issues a request data packet (not shown) from client computer system 110c that is routed through communications line 120 to server computer system 130c. RMON probe 140 observes the request data packet, and captures and counts the data packet. Server computer system 130c responds to the request data packet and transmits a response data packet (not shown). However, because of increased traffic on communications line 120, the response data packet is more efficiently routed back to client computer system 110c through communications line 122 and is observed by RMON probe 142. RMON probe 142 captures and counts the data packet.

In the prior art, the RMON probes are only capable of making a count of the number of captured data packets, which provides only a limited measure of the performance of the network. Thus, one drawback to the prior art is that, because of the nature of switched networks, a data packet may take one route from a client computer system to a server computer system and a different route back, and therefore the packets are never correlated because they are counted by two different probes, and each probe operates independently. Hence, in the prior art, a response data packet is not correlated with the request data packet that prompted the response.

For example, the network manager would expect that the number of captured response data packets and captured request data packets would be equal, and if not, this would provide an indication of a potential problem on the network. However, this information only indicates the reliability of the network for carrying data packets, or the reliability of a server computer system to respond to a request, but does not provide a measure of the time it took to respond to the request. Therefore, another drawback to the prior art is that it does not measure performance times such as application response time, application processing time, or protocol latency, because request and response data packets might not be correlated if they are captured by different probes. Thus, in the prior art the network manager or a user does not have the desired information regarding the average and worst-case performance times. Hence, another drawback to the prior art is that the network services provider cannot readily demonstrate compliance to the governing SLA.

With reference again to FIG. 1, it is possible that, after the response data packet passes RMON probe 142 and is counted by RMON probe 142, a fault on communications line 122 may occur so that the response data packet is not delivered to client computer system 110c. For example, a failure of switch 125 may occur so that the response data packet is not able to complete its journey. However, in the prior art the response data packet may still be counted as a successful transaction. Thus, an additional disadvantage to the prior art is that a fault in the network may not be detected by the network monitoring software, and would only be eventually noticed by the user who did not receive a response to his/her request. Another drawback to the prior art is that a fault in the network may not be noticed in a timely manner. An additional drawback to the prior art is that the accuracy of the performance statistics may be affected by the location of the RMON probes.

One prior art system attempts to address some of the disadvantages identified above by incorporating RMON into routers or switches instead of a probe, and adding a plurality of these components to the network. However, a disadvantage to this prior art system is that the speed at which the component (e.g., a switch) performs its primary function is significantly slowed by the addition of the network monitoring function, because of the complexity of RMON MIBs. In addition, another drawback to this prior art system is that the cost of the component such as a switch is substantially increased by the incorporation of the RMON facilities This prior art system also does not address the other disadvantages identified above, such as the inability to measure performance times and demonstrate compliance with SLAs in a switched communication system.

Accordingly, a need exists for a method to monitor a computer system communication network that readily and quickly detects and identifies a degradation of the network. A need further exists for a method that accomplishes the above and enables the network manager to demonstrate compliance with the provisions of the governing SLA. A need yet exists for a method that accomplishes the above and also provides an accurate measure of the network performance as well as its reliability. A need exists yet further for a method that accomplishes the above and can determine application information for network applications that do not use established means for identification or that are transmitted in encrypted data packets. Finally, a need exists for a method that accomplishes the above without interfering with the processing of a network application. The present invention solves these needs. These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method to monitor a computer system communication network that readily and quickly detects and identifies a degradation of the network. The present invention also provides a method that accomplishes the above and enables the network manager to demonstrate compliance with the provisions of the governing service level agreement (SLA). The present invention further provides a method that accomplishes the above and also provides an accurate measure of the network performance as well as its reliability. Finally, the present invention provides a method that accomplishes the above and can determine application information for network applications that do not use established means for identification or that are transmitted in encrypted data packets.

The present invention described herein provides a method for quantifying performance of a communication network having computer systems communicatively coupled to each other with communication equipment, where the computer systems are executing network applications that send and receive either encrypted or unencrypted data packets over the communication network. In one embodiment, between an application program interface and a protocol stack in a computer system, where the application program interface resides in an application layer of the computer system and the protocol stack resides in a kernel layer of the computer system, the present invention executes a process for identifying a network application, where the network application originates a request data packet and a response data packet. Second, in this embodiment the present invention records time-stamps when the request data packet and the response data packet are between the application program interface and the protocol stack in the computer system. Third, in this embodiment the present invention computes a difference between a first time-stamp and a second time-stamp. In this embodiment, the present invention next calculates performance statistics measured on the difference and stores the performance statistics in a memory unit of the computer system, where the memory unit is read-accessible and write-accessible from both the application layer and the kernel layer of the computer system. Finally, in this embodiment of the present invention, the computer system reports the performance statistics to a central computer system.

In another embodiment, the present invention determines application information corresponding to a network application. In this embodiment, the present invention reads data contained in a data packet, where the data corresponds to the network application and identifies an executable memory unit location where the application information is stored. The present invention then reads the application information from the executable memory unit location.

In still another embodiment, the present invention applies an encryption process between the application program interface and the protocol stack in a computer system to define encryption recognition characteristics corresponding to an unencrypted data packet. The present invention stores the encryption recognition characteristics in a memory unit within the computer system. The present invention then compares the encryption recognition characteristics to an encrypted data packet, thereby correlating the encrypted data packet to the unencrypted data packet.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 provides an example of a filter table that is applied in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., processes of FIGS. 9, 10, 11, 12 and 15), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
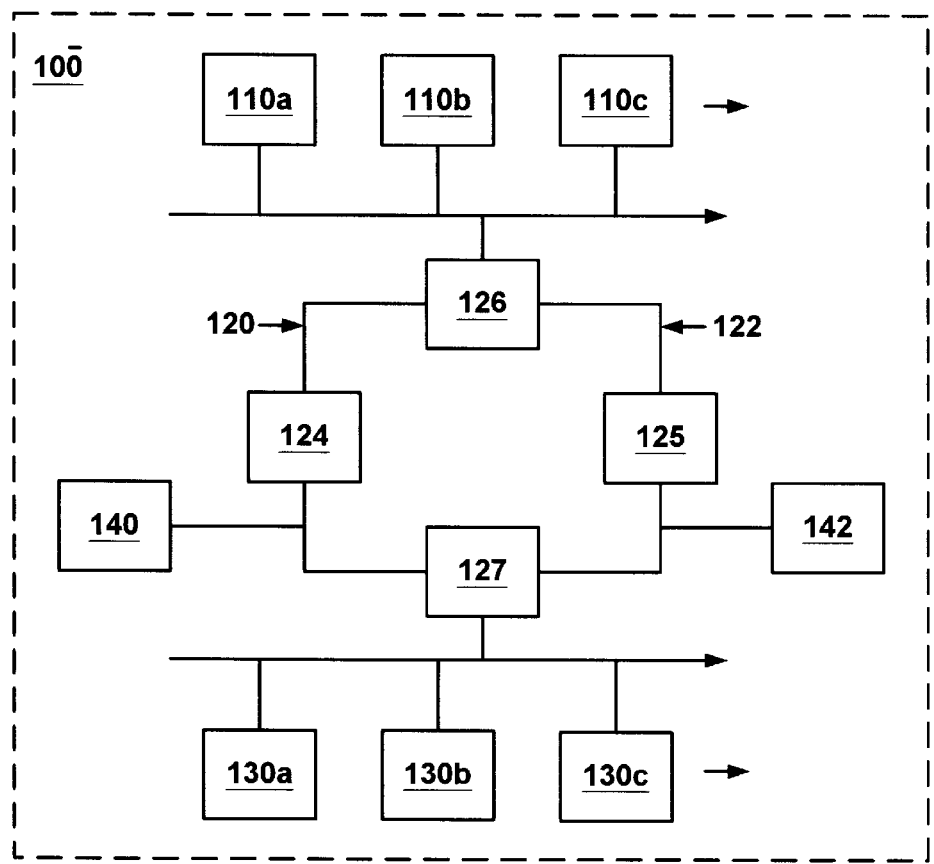
FIG. 1 is a block diagram of a computer system communication network in accordance with the prior art.
Figure 2:
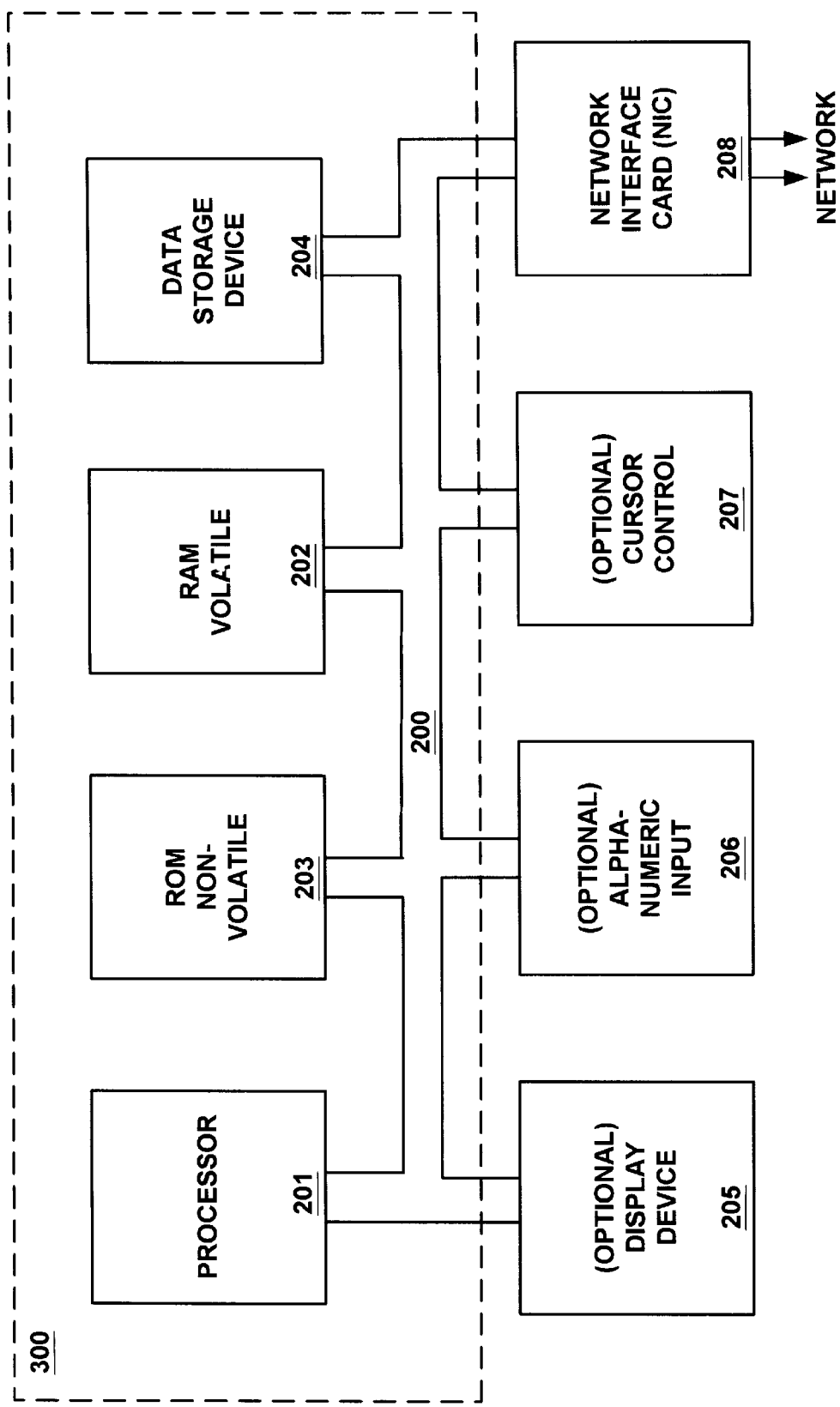
FIG. 2 shows a general purpose computer system upon which embodiments of the present invention may be practiced.

Refer to FIG. 2 which illustrates client computer system 300 (the following discussion is also pertinent to a server computer system). In general, client computer system 300 used by the embodiments of the present invention comprises a bus 200 for communicating information, a central processor 201 coupled with bus 200 for processing information and instructions, a random access memory 202 coupled with bus 200 for storing information and instructions for central processor 201, a read-only memory 203 coupled with bus 200 for storing static information and instructions for central processor 201, a data storage device 204 such as a magnetic or optical disk and disk drive coupled with bus 200 for storing information and instructions, a display device 205 coupled to bus 200 for displaying information to the computer user, an optional alphanumeric input device 206 including alphanumeric and function keys coupled to bus 200 for communicating information and command selections to central processor 201, an optional cursor control device 207 coupled to bus 200 for communicating user input information and command selections to central processor 201, and a network interface card (NIC) 208 coupled to bus 200 for communicating from a communication network to central processor 201.

Display device 205 of FIG. 2 utilized with client computer system 300 of the present invention may be a liquid crystal device, cathode ray tube, or other display device suitable for creating graphic images and alphanumeric characters recognizable to the user. Cursor control device 207 allows the computer user to dynamically signal the two-dimensional movement of a visible symbol (pointer) on a display screen of display device 205. Many implementations of the cursor control device are known in the art including a trackball, mouse, joystick or special keys on alphanumeric input device 206 capable of signaling movement of a given direction or manner of displacement. It is to be appreciated that the cursor means 207 also may be directed and/or activated via input from the keyboard using special keys and key sequence commands. Alternatively, the cursor may be directed and/or activated via input from a number of specially adapted cursor directing devices.

Figure 3:
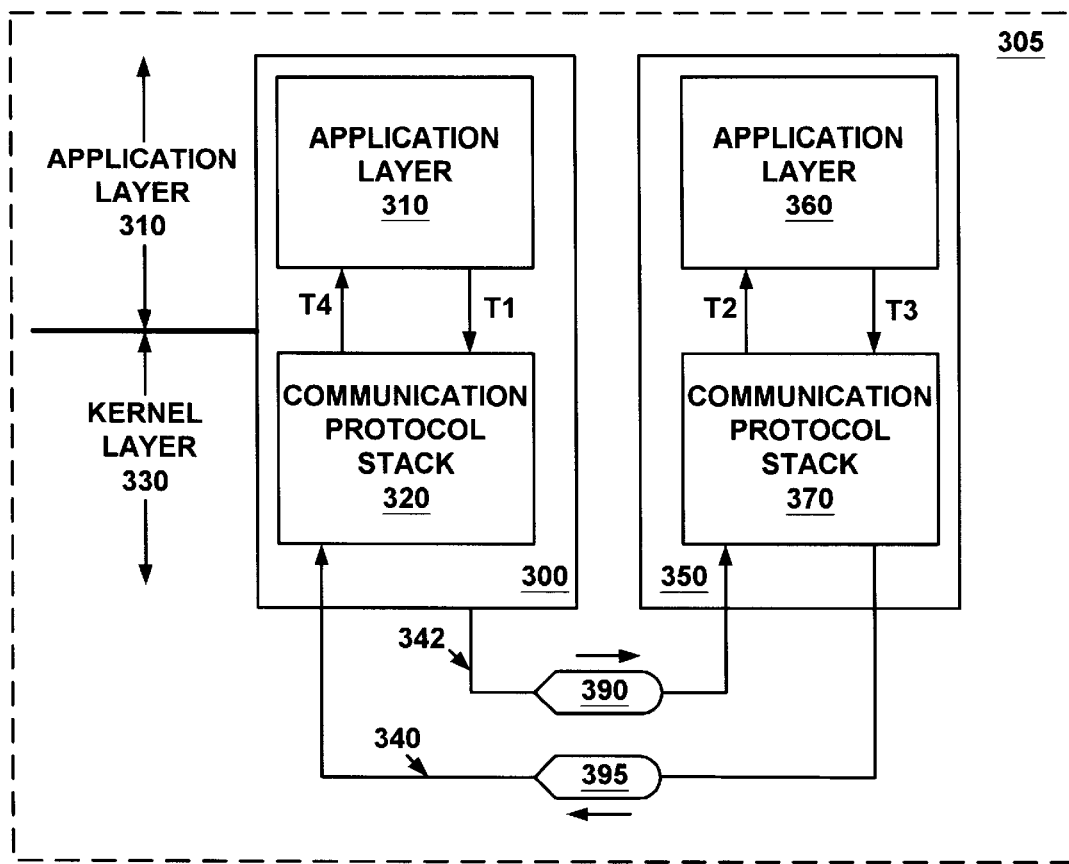
FIG. 3 is a diagram of an exemplary computer system communication network upon which the present invention may be practiced.

With reference now to FIG. 3, a diagram showing client computer system 300 coupled to server computer system 350 in communication network 305 is provided. In a typical communication network, there are a plurality of client computer systems and server computer systems coupled to each other with communications equipment. For the discussion herein, a single client computer system 300 is shown coupled via communications lines 340 and 342 with a single server computer system 350, but more computer systems could be employed.

With reference still to FIG. 3, the software executed by central processor 201 (FIG. 2) of client computer system 300 is represented by application layer 310 which is separated from the remainder of protocol stack 320. Application layer 310 defines the manner in which network application programs ("network applications") interact with the communication network, where network applications include computer software programs, word processors, database management systems, electronic mail, and the like. Protocol stack 320 contains the remaining layers of software that define the computer-to-computer or computer-to-network protocol, where protocol defines the procedures to be followed when data are transmitted and received. In a similar manner, server computer system 350 includes analogous application layer 360 and protocol stack 370. Protocol stacks 320 and 370 each reside in kernel layer 330, or Ring Zero (R0), in their respective computer system. The application layer (310, 360) is alternatively referred to as Ring Three (R3).

With reference to FIG. 3, in response to a user command requesting that a particular network application be performed, application layer 310 of client computer system 300 generates request data packet 390 and transmits it to server computer system 350. In response, application layer 360 of server computer system 350 generates response or acknowledge data packet 395 and transmits it to client computer system 300. In this example, request data packet 390 and response data packet 395 are shown traveling by different communications lines (e.g., in a switched network environment), but it is appreciated that in the present invention the data packets alternatively can travel over the same communications line.

Figure 4:
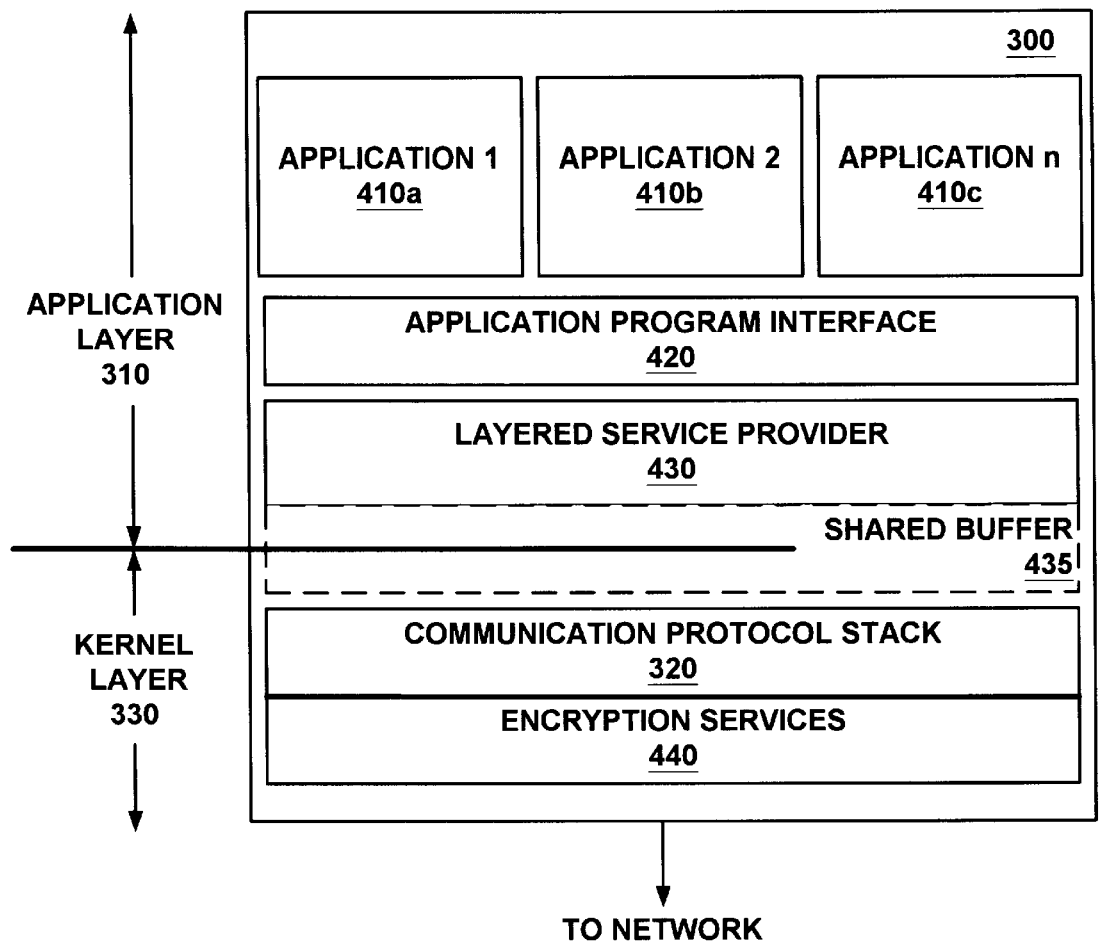
FIG. 4 is a logical diagram of layers within an exemplary computer system incorporating one embodiment of the present invention.

With reference now to FIG. 4, application layer 310 of FIG. 3 is represented in FIG. 4 as being comprised of network applications 1, 2, . . . , n, represented respectively by 410a, 410b and 410c, and application program interface 420. Application layer 360 in a server computer system is similarly comprised of network applications and an application program interface. Application program interface 420 defines a standard interface for applications utilized by a network. Application program interface 420 specifies socket calls for an application being performed on the network. For example, a "send" socket call is initiated when a request for a network application is being sent via request data packet 390 of FIG. 3, and a corresponding "receive" socket call is initiated when the corresponding response is received via response data packet 395 (FIG. 3) for the requested network application. Typical socket calls include: listen( ), accept( ), send( ), recv( ), sendto( ) and recvfrom( ). A socket call opened by a computer system to send a data packet is generally referred to as a "send" socket call and a socket call opened by a computer system to receive a data packet is generally referred to as a "receive" socket call. Application program interface 420 is exemplified by the Windows Socket API, or Winsock, although other APIs may be used in accordance with the present invention.

The present invention is a server- and client-implemented process that determines application information and performance statistics associated with network applications used by client and server computer systems in both unencrypted and encrypted network environments. The present invention is implemented using a software module inserted between the application layer, specifically the application program interface, and the protocol stack in a computer system. The present embodiment of the present invention is referred to as a "layered service provider." The present invention layered service provider also incorporates a shared buffer that both the application layer and the kernel layer of a computer system are able to access, read, and write to.

With reference to FIG. 4, in the present embodiment, layered service provider 430 is integrated between the application layer, specifically application program interface 420, and protocol stack 320. As such, layered service provider 430 is advantageously in a position to observe all request and response data packets originating from and received by computer system 300. In addition, layered service provider 430 is in a position to observe all socket calls generated by application program interface 420. In the present embodiment, layered service provider 430 incorporates shared buffer 435. Shared buffer 435 is configured in the present invention so that it can be written to and read from both application layer 310 and kernel layer 330.

With reference to FIG. 4, protocol stack 320 includes encryption services 440, such as the Internet Engineering Task Force (IETF) standard known as IPSec (Internet Protocol Security) and other encryption services. A data packet passing through encryption services 420 is encrypted before it is transmitted over the network by client computer system 300. Thus, layered service provider 430 is advantageously in a position to observe request data packets before they are encrypted and to observe response data packets after they have been deciphered.

Figure 5:
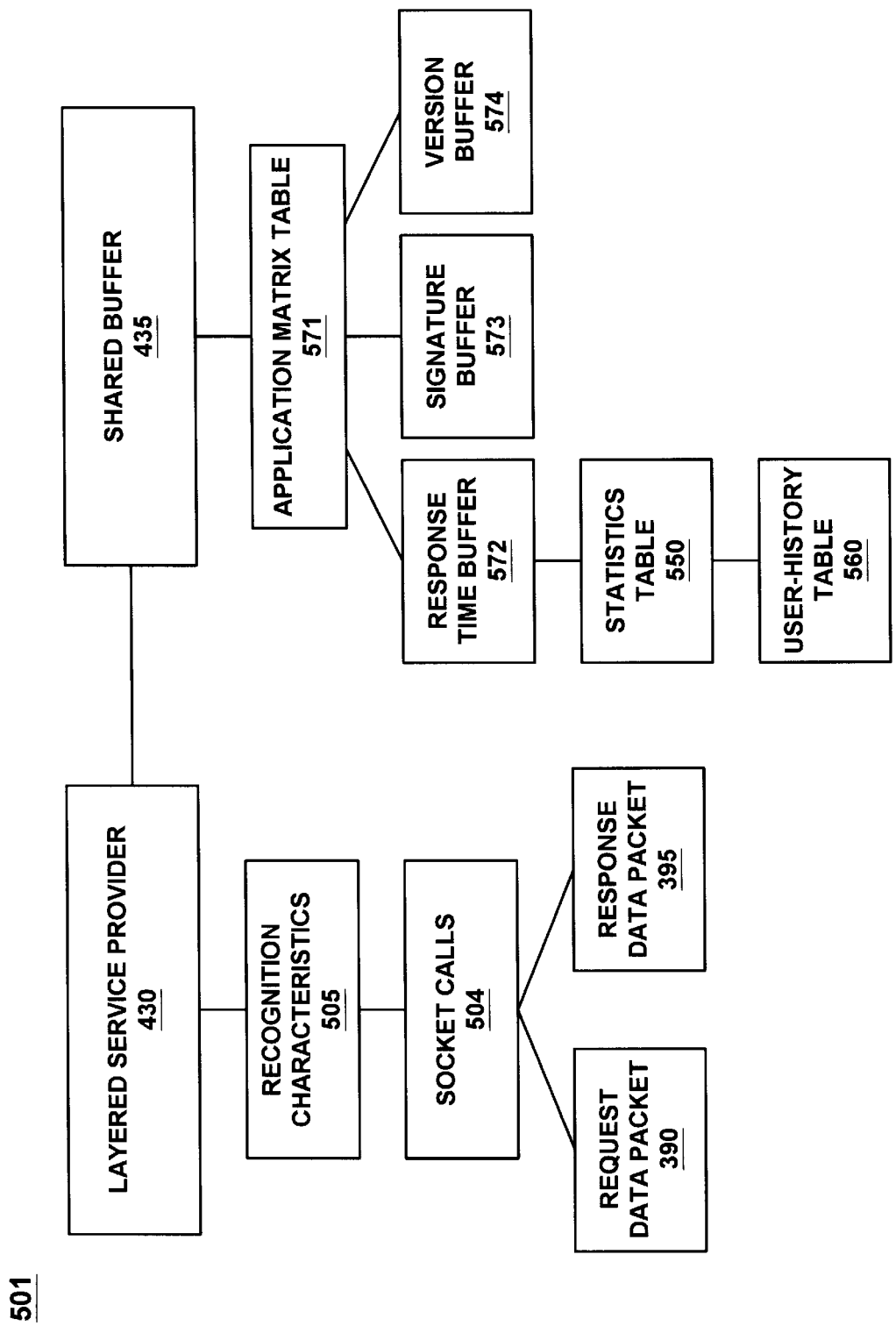
FIG. 5 is a diagram illustrating an arrangement of memory units in a computer system in accordance with one embodiment of the present invention.

Refer now to FIG. 5, which illustrates memory structure 501 of the present embodiment of the present invention within the computer-readable memory units of client computer system 300 and also in server computer system 350 of FIG. 3. Socket calls 504 are issued by client computer system 300 and server computer system 350, where socket calls 504 are send and receive socket calls corresponding to request data packet 390 and response data packet 395 that in turn correspond to the network application of interest (e.g., network application 410c of FIG. 4). In one embodiment, recognition characteristics 505 include filters applied at client computer system 300 and server computer system 350, where the filters are used to recognize and select request data packet 390 and response data packet 395 that correspond to network application 410c. In an alternative embodiment, recognition characteristics are not specified, so that the present invention may monitor all network applications. Further discussion of filters and socket calls is provided below—refer to "Filters and Socket Calls" herein.

With reference to FIG. 5, in the present embodiment, shared buffer 435 is used to store information from layered service provider 430. Data are also read from and written to shared buffer 435 from both the kernel layer (R0) and the application layer (R3) of a computer system. In the present embodiment, shared buffer 435 creates an application matrix table 571 for each network application in the process of being performed on a computer system (e.g., network application n represented by 410c in FIG. 4). In the present embodiment, application matrix table 571 includes response time data buffer 572, signature buffer 573, and version buffer 574.

With reference to FIG. 5, in one embodiment, layered service provider 430 is used to apply a time-stamp to each request data packet 390 and response data packet 395 corresponding to each network application that will be used as the basis for generating performance statistics (performance statistics are discussed below in conjunction with FIG. 8—refer to "Performance Statistics" herein). In this embodiment, layered service provider 430 is also used to correlate a response data packet to the request data packet that prompted the response. In this embodiment, response time data buffer 572 is used to store the time-stamps applied to each request data packet 390 and response data packet 395 selected by a filter and associated with network application 410c. In this embodiment, response time buffer 572 also records the time difference between the time-stamps for correlated data packets.

Continuing with reference to FIG. 5, in another embodiment, layered service provider 430 is used to apply a time-stamp to each socket call 504 corresponding to each network application that will be used as the basis for generating performance statistics. In this embodiment, layered service provider 430 is also used to correlate a send socket call with the appropriate receive socket call. In this embodiment, response time data buffer 572 is used to store the time-stamps applied to send and receive socket calls associated with network application 410c. In this embodiment, response time buffer 572 also records the time difference between the time-stamps for correlated socket calls.

In the present embodiment, statistics table 550 of FIG. 5 is used to store performance statistics that are based on the information stored in response time buffer 572. Performance statistics are determined using the process described below in conjunction with FIGS. 9 and 10—refer to "Measurement of Performance Statistics" herein. At a time interval specified by the network manager, the performance statistics in statistics table 550 are read to user-history table 560.

In the present embodiment, signature buffer 573 of FIG. 5 is used to store encryption recognition characteristics defined by layered service provider 430 in the present embodiment. Encryption recognition characteristics stored in signature buffer 573 are defined by layered service provider 430 by applying the same encryption process also applied in encryption services 440 of FIG. 4. Encryption recognition characteristics in signature buffer 573 are used in a computer system to recognize encrypted data packets and to correlate each encrypted data packet to its unencrypted version. In one embodiment, signature buffer 573 is comprised of a buffer containing encryption recognition characteristics for request data packets, and another buffer containing encryption recognition characteristics for response data packets. In one embodiment, signature buffer 573 also incorporates a buffer for storing copies of unencrypted request and response data packets (e.g., request data packet 390 before it is encrypted, and response data packet 395 after it is deciphered).

In the present embodiment, version buffer 574 of FIG. 5 is used to store application information associated with a network application corresponding to application matrix table 571 (e.g., network application 410c of FIG. 4). Layered service provider 430 implements a process to read the application information from the executable memory unit location (e.g., an executable file) associated with application 410c.

Figure 6:
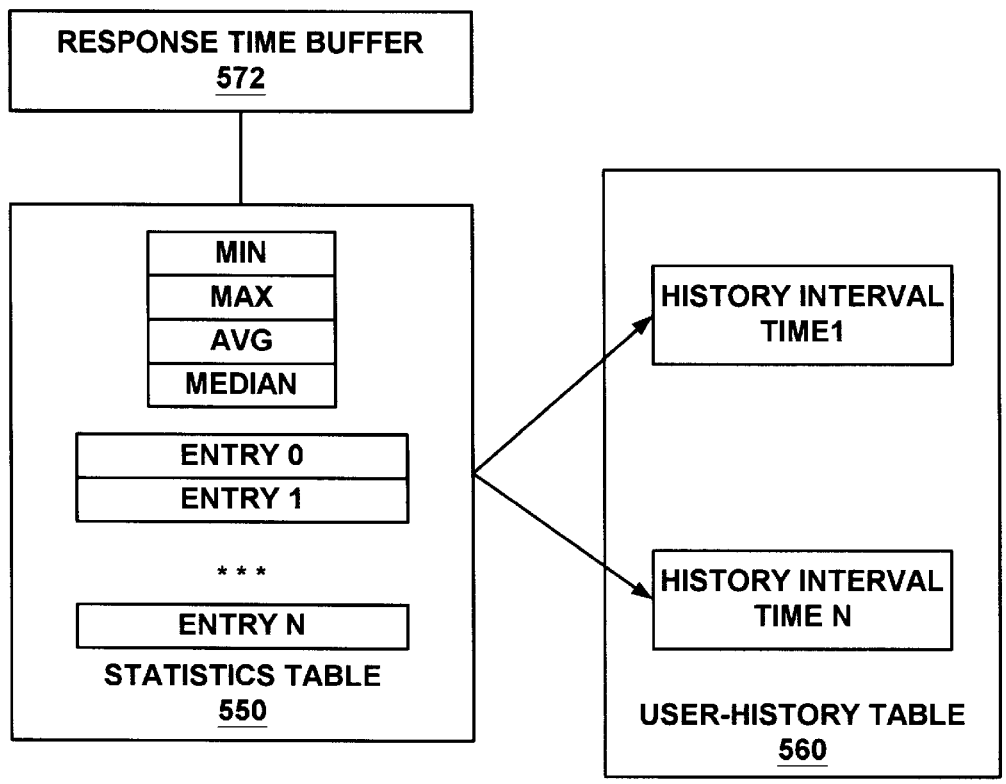
FIG. 6 is an illustration of a performance statistics data table in accordance with one embodiment of the present invention.

Refer now to FIG. 6 which shows statistics table 550. In the present embodiment, statistics table 550 accumulates the minimum, maximum, average and median for the entries stored in response time buffer 572. The information stored in statistics table 550 is collected for a specified time interval, and then read to user-history table 560. In user-history table 560, data are stored for each of a plurality of time intervals. The data stored for each time interval may also be combined to compute data for a larger time interval.

Filters and Socket Calls

FIG. 7 exemplifies a filter table containing recognition characteristics 505 (FIG. 5) applied by layered service provider 430 (FIG. 4) in accordance with the present invention. In the present embodiment, filter table 705 specifies the filters that are to be applied according to the following information:

Name: the name of the filter;

Application: the name of the network application associated with the filter if the application name is known;

Direction: whether the data packet is a request data packet or a response data packet as indicated by the direction that the data packet is flowing through layered service provider 430 (e.g., the data packet is flowing out of the layered service provider or into the layered service provider);

Number: the number of recognition characteristics, or criteria, that need to be satisfied for a match between a data packet and the filter;

Criteria: the recognition characteristics that need to be satisfied for a match between a data packet and the filter, and the field in the data packet to which the comparison is to be made (e.g., "0" in the first place indicates an offset of zero so the comparison should be made to the first byte in the data packet, "4" in the second place indicates the first four bytes in the data packet should be used for the comparison, and "RETR" indicates the information that, if contained in those four bytes, would satisfy the filter and result in a match);

Operation: a logical operator, such as "and" or "or," that are to be applied to link filters to create a more complex filter (e.g., "and" would indicate that both filters need to be satisfied for a match to occur);

Action: the action to be taken when a match between a data packet and the filter is determined (e.g., "record time" to time-stamp a data packet); and Match Count: the number of matches between data packets and the filter.

Thus, each filter is uniquely named and the network manager is able to specify the filters to be applied to request packets 390 and response packets 395 by referencing the appropriate filter name in layered service provider 430 of FIG. 4.

In the present embodiment, socket calls 504 of FIG. 5 are issued by the application program interface when a network application is requested by client computer system 300 or when server computer 350 is responding to the network application request. Typical socket calls include: listen( ), accept( ), send( ), recv( ), sendto( ) and recvfrom( ). Each socket associated with a socket call is uniquely identified, and each socket call also contains unique characteristics that enable it to be identified with a specific network application request and response. For example, a socket call includes the process identification identifying the network application being performed, the port identification assigned on a client computer system and on a server computer system, and the like.

Performance Statistics

Figure 8:
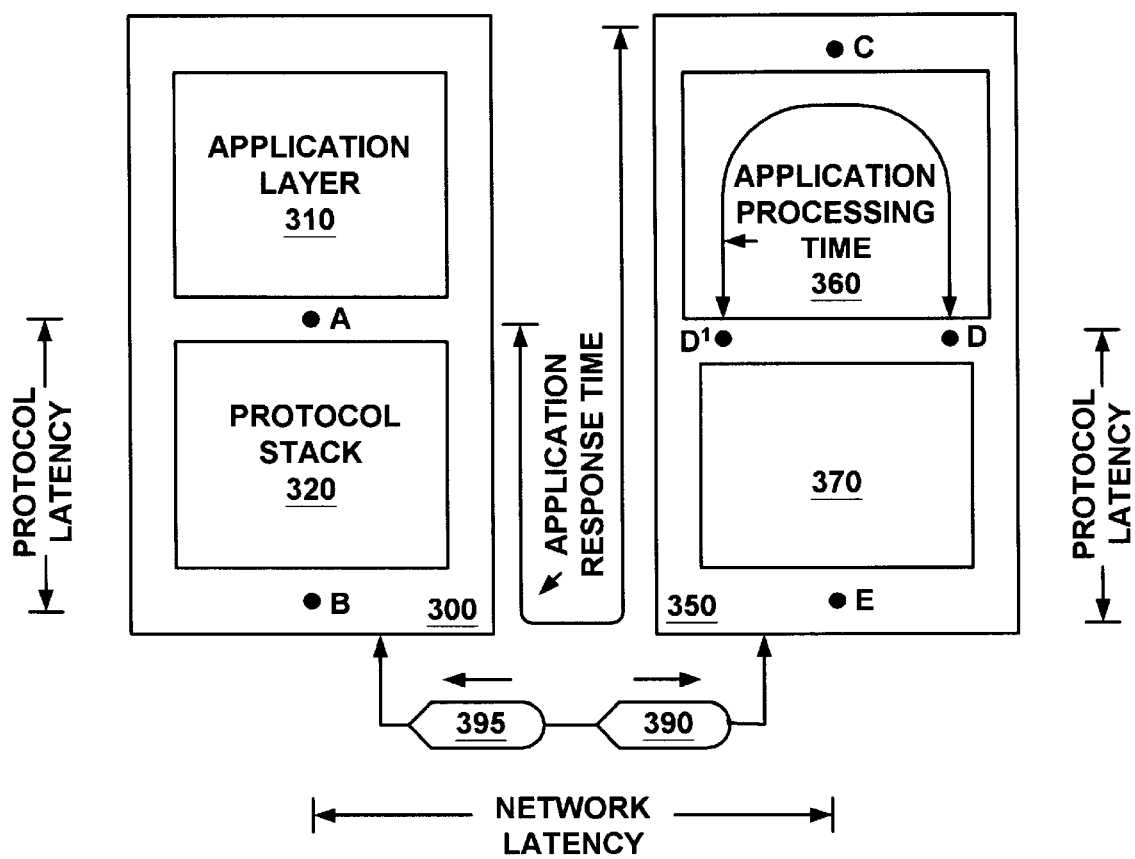
FIG. 8 is a diagram defining performance statistics for an exemplary computer system communication network upon which the present invention may be practiced.

With reference now to FIG. 8, client computer system 300 is coupled to server computer system 350 in communication network 305. A data packet takes a measurable amount of time to travel from client computer system 300 to server computer system 350, and vice versa. It also takes a measurable amount of time for a computer system to perform a network application.

Continuing with reference to FIG. 8, "protocol latency" is the amount of time for a data packet to travel one-way through a protocol stack of a computer system. Hence, protocol latency is the amount of time for a data packet to travel from point A to point B or from point B to point A in protocol stack 320, or from point D to point E or point E to point D in protocol stack 370.

With reference to FIG. 8, "application processing time" is the time required for server computer system 350 to complete performing a network application in response to a request received from client computer system 300. In one embodiment of the present invention, application processing time is the elapsed time period between the time when request data packet 390 enters application layer 360 of server computer system 350 and the time when the corresponding response data packet 395 exits application layer 360 of server computer system 350 (one-way from point D to point E). In another embodiment, application processing time is the period from the time when the application program interface of server computer system 350 issues a receive socket call corresponding to request data packet 390 to the time when the application program interface of server computer system 350 issues a send socket call corresponding to response data packet 395. Application processing time is thus the difference between times T3 and T2 of FIG. 3.

With reference still to FIG. 8, in one embodiment of the present invention, "application response time" is the elapsed time period between the time when request data packet 390 exits application layer 310 of client computer system 300 and the time when response data packet 395 enters application layer 310 of client computer system 300 (round trip from point A to point C), where response data packet 395 is sent in response to request data packet 390. In another embodiment, application response time is the time period between when application program interface 420 of FIG. 4 generates a send socket call corresponding to request data packet 390 and a receive socket call corresponding to receive socket call 395. Application response time is thus the time between times T4 and T1 of FIG. 3.

With reference to FIG. 8, "network latency" is the amount of time required for the data packet to travel from point B at which it exits one computer system to point E at which it enters another computer system (e.g., the time to travel one-way from network interface card 208 in client computer system 300 of FIG. 2, to network interface card 208 in a server computer system on the network, and vice versa). In one embodiment of the present invention, the measurement of network latency is based on an assumption that protocol latency is zero, and thus network latency is the difference between application response time and application processing time.

Measurement of Performance Statistics

Figure 9:
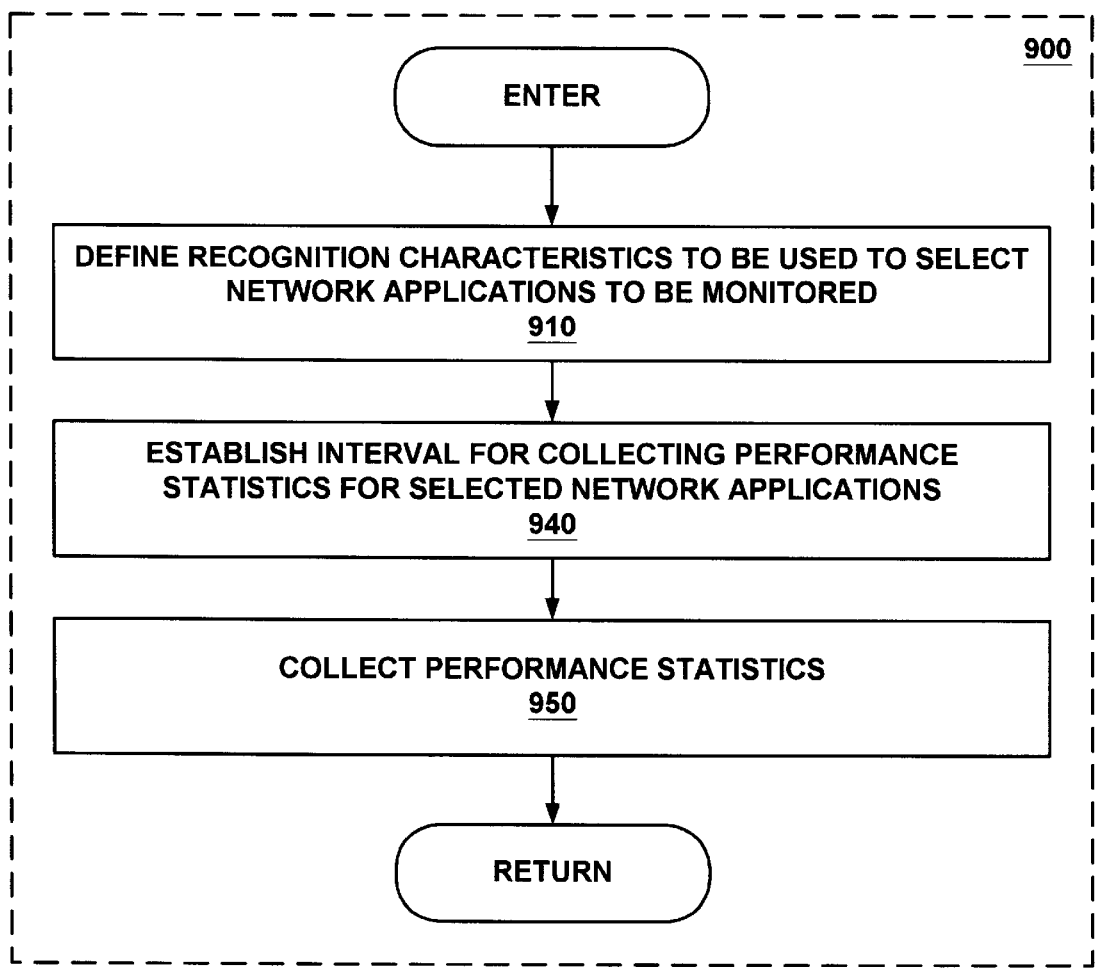
FIG. 9 is a flow chart of a process for collecting performance statistics in accordance with one embodiment of the present invention.

FIG. 9 illustrates a process 900 for collecting performance statistics in accordance with one embodiment of the present invention, where process 900 is implemented as program instructions stored in computer-readable memory units of an end-node computer system such as client computer system 300 (FIG. 3) and executed by central processor 201 (FIG. 2), and can also be stored and executed on server computer system 350 (FIG. 3). Process 900 is implemented via the present invention layered service provider 430 of FIG. 4. Layered service provider 430 is advantageously situated in the data stream and does not interfere with processing of the network application.

With reference to FIG. 9, in one embodiment, in step 910, recognition characteristics 505 (e.g., filters 705 of FIG. 7) are defined and created by the network manager to identify and select request and response data packets (e.g., request data packet 390 and response data packet 395 of FIG. 3) corresponding to the network application of interest. Recognition characteristics 505 are used to screen request and response data packets by comparing the bit/byte pattern of the data in certain defined fields within the data packets to the specified recognition characteristics. Data packets are selected on the basis of a match (or alternatively, a failure to match) with recognition characteristics 505. In an alternative embodiment, filters are not specified so that all network applications may be monitored.

Filter 705 of FIG. 7 is defined with sufficient detail such that a request data packet and a response data packet can be matched and correlated; that is, a response data packet can be correlated to the request data packet that prompted the response. For example, a response data packet can be correlated to a request data packet using the internet protocol (IP) address and the port identification numbers.

In another embodiment, socket calls 504 of FIG. 5 are issued by client computer system 300 and server computer system 350, where socket calls 504 are send and receive socket calls corresponding to request data packet 390 and response data packet 395, that in turn correspond to the network application of interest. Hence, in one embodiment, the process identification contained within socket calls 504 is used to identify the network applications that are to be monitored. A send socket call contains sufficient detail such that a send socket call associated with a network application is correlated to the receive socket call corresponding to the same network application.

With reference back to FIG. 9, in step 940 of the present embodiment, the network manager specifies the time interval over which the performance statistics are to be collected. In step 950, the network manager activates layered service provider 430 of FIG. 4 to collect the desired performance statistics in accordance with the present invention.

Figure 10:
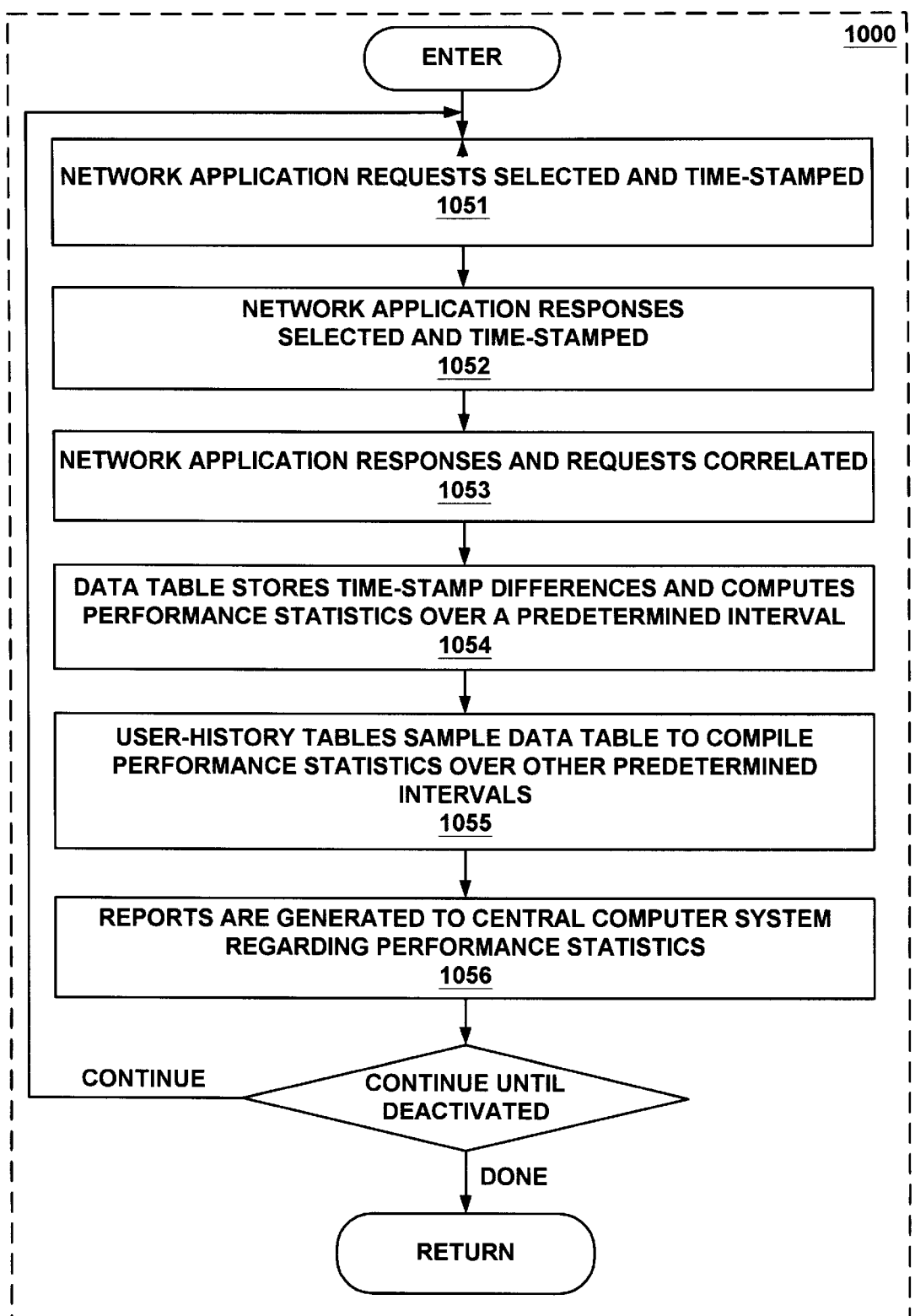
FIG. 10 is a flow chart of a process for computing performance statistics in accordance with one embodiment of the present invention.

FIG. 10 provides details of step 950 (FIG. 9) that are implemented as program instructions stored in computer-readable memory units of client computer system 300 (FIG. 3) and executed by central processor 201 (FIG. 2), and can also be stored and executed on server computer system 350 (FIG. 3). Process 1000 is thus implemented in the end-node computer systems of a network. Process 1000 is implemented via present invention layered service provider 430 of FIG. 4.

With reference to FIG. 10, in one embodiment of the present invention, in steps 1051 and 1052 the recognition characteristics (e.g., recognition characteristics 505 of FIG. 5) are applied as described above in conjunction with FIG. 9, in order to identify and select the network application that is being monitored. In this embodiment, with reference also to FIG. 3, in step 1051 recognition characteristics 505 are applied to request data packets 390 transmitted by client computer system 300. In step 1052, in this embodiment recognition characteristics 505 are applied to response data packets 395 transmitted by server computer system 350. Thus, recognition characteristics are applied to each of the request data packets and response data packets, and the data packets that satisfy the recognition characteristics are collected and will be used as the basis for generating performance statistics. In an alternative embodiment, recognition characteristics are not applied so that all network applications may be monitored.

In the present embodiment, recognition characteristics 505 are applied at the layered service provider of the end-node computer systems. That is, in the present embodiment recognition characteristics are applied by layered service provider 430 of client computer system 300 and by the layered service provider of server computer system 350, depending on the type of performance statistics that are being collected.

With reference again to steps 1051 and 1052 of FIG. 10, in the present embodiment, time-stamps are applied at the layered service provider of the end-node computer systems; that is, time-stamps are applied at layered service provider 430 of client computer system 300 and at the layered service provider of server computer system 350. In one embodiment, in step 1051 request data packet 390 receives a time-stamp from layered service provider 430 of client computer system 300. Similarly, at the layered service provider in server computer system 350, in this embodiment a time-stamp is applied to request data packet 390 by the layered service provider of server computer system 350.

In another embodiment, a send socket call corresponding to a request data packet (e.g., request data packet 390) receives a time-stamp from layered service provider 430 of client computer system 300. In this embodiment, a time-stamp is applied by the layered service provider of server computer system 350 to the receive socket call corresponding to receipt of the data packet that caused the send socket call.

With reference to FIG. 10, in step 1052, in one embodiment a time-stamp is applied by the layered service provider of server computer system 350 to response data packet 395. Similarly, in this embodiment a time-stamp is applied to response data packet 395 by layered service provider 430 of client computer system 300.

Alternatively, in another embodiment a time-stamp is applied by the layered service provider of server computer system 350 to the send socket call corresponding to response data packet 395. In this embodiment a time-stamp is applied by layered service provider 430 of client computer system 300 to the receive socket call corresponding to the send socket call.

By using the layered service provider in the present invention to apply the time-stamps to socket calls or to data packets in the end-node computer systems, the time-stamps provide an accurate basis for measuring performance times and deriving performance statistics for a network.

With reference now to step 1053 of FIG. 10, and also with reference to FIG. 3, in one embodiment the present invention layered service provider 430 correlates response data packet 395 from server computer system 350 to request data packet 390 from client computer system 300; that is, the two data packets are identified, matched, and paired to form a correlated data packet. In another embodiment, send and receive socket calls are correlated by layered service provider 430.

In the present invention, correlation of data packets and socket calls is performed by comparing characteristics of the data packets and socket calls in order to identify a match. Each request data packet 390 and response data packet 395 contains data organized in a logical format, including the source address, the destination address, the process identification, and the like. Each request data packet 390 and response data packet 395 is sufficiently unique that by comparing the data contained in a response data packet to the data contained in a request data packet, the layered service providers in client computer system 300 and server computer system 350 are able to identify a match of a response data packet to the request data packet that prompted the response, thereby correlating a response data packet to a request data packet. Similarly, socket calls are uniquely characterized so that the layered service providers in client computer system 300 and server computer system 350 are able to correlate a receive socket call to the send socket call associated with the network application of interest.

With reference now to step 1054 of FIG. 10, one embodiment of the present invention determines performance time based on the time-stamps of each pair of correlated data packets. This embodiment computes the time difference between the time-stamps that were applied to the request data packet that comprises one part of the correlated data packet and the time-stamps that were applied to the response data packet that comprises the other part of the correlated data packet. In this embodiment, with reference also to FIG. 3, the present invention computes the application response time using the time-stamps of each correlated data packet, by computing the difference between the time-stamp applied to request data packet 390 by layered service provider 430 of client computer system 300 and the time-stamp applied to correlated response data packet 395 by layered service provider 430 of client computer system 300. In this embodiment, the present invention computes the application processing time using the time-stamps of each correlated data packet, by computing the difference between the time-stamp applied to request data packet 390 by the layered service provider of server computer system 350 and the time-stamp applied to correlated response data packet 395 by the layered service provider of server computer system 350. In this embodiment, the present invention calculates the network latency by subtracting the above application processing time from the above application response time. In this embodiment, the present invention calculates the protocol latency in client computer system 300 using the time-stamp applied to each request and response data packet by layered service provider 430 and a corresponding time-stamp applied by client computer system 300 to each request and response data packet when the data packet is at the bottom of protocol stack 320. In the same manner, the protocol latency in server computer system 350 is calculated. (The time stamps applied at the bottom of protocol stacks 320 and 370 of FIG. 3 are described in the application filed concurrently with the instant application, assigned to the assignee of the present invention, "Application Response Time and Network Latency Monitoring Using End-Node Computer Systems," Richard A. Fletcher and Prakash C. Banthia, Ser. No. 09/141,968.)

Alternatively, in another embodiment the present invention uses the difference between the time-stamps applied to the send and receive socket calls to determine performance times in the same manner as described above.

As previously discussed, the time-stamps provide an accurate measure of when a network application is transmitted and received by the computer systems on the communication network. Thus, the use of the time-stamps to determine application response time, application processing time, network latency, and protocol latency provide an accurate measure of network performance and reliability.

With continued reference to FIG. 10, in one embodiment the present invention also determines a file transfer rate from a client computer system to a server computer system, and vice versa, using the performance times determined as described above. As described above, in step 1051, request data packet 390 receives a time-stamp from layered service provider 430 of client computer system 300 and a time-stamp from the layered service provider of server computer system 350. In step 1054, this embodiment determines the time difference between these two time-stamps. In the case where request data packet 390 is transmitting a file, the file size in bytes is known, and therefore the file transfer rate in bytes per unit time (e.g., bytes/second) is readily determined by dividing the size of the file by the difference between the two time-stamps. The file transfer rate for transmitting a file from server computer system 350 to client computer system 300 is similarly determined, using the time-stamps applied to response data packet 395 in step 1052 by layered service provider 430 in each of the client and server computer systems, computing the time difference as described in step 1054, and dividing the file size by the time difference. Alternatively, in another embodiment the file transfer rate is determined as described above but using the time-stamps applied to the send and receive socket calls.

With reference still to step 1054 of FIG. 10, the present embodiment of the present invention calculates performance statistics based on the application response time, application processing time, network latency and protocol latency for a plurality of network applications. The performance statistics include statistics such as the mean, median, minimum and maximum performance times. In the present embodiment, like performance statistics pertaining to file transfer rates are also determined. In the present embodiment, the performance statistics are automatically calculated and accumulated for a programmable interval of time specified by the network manager, e.g., for 30-minute intervals of time, although it is appreciated that other units of time can be specified in accordance with the present invention. The present embodiment then stores the performance statistics in a memory unit within a computer system that is on the communication network. In one embodiment, the performance statistics associated with a client computer system are stored in a memory unit within that client computer system.

With reference now to step 1055 of FIG. 10, in the present embodiment the performance statistics for each consecutive 30-minute interval are then automatically used to calculate performance statistics for a programmable interval of time, e.g., for a 6-hour interval, by combining the performance statistics for each 30-minute interval. The performance statistics for each such interval are automatically used to determine performance statistics for a longer interval of time, e.g., for a 24-hour interval, by combining the performance statistics for each 6-hour interval. In this manner, the performance statistics are readily available to the network manager for either a shorter or a longer time interval. It is appreciated that other intervals of time can be specified in accordance with the present invention. Thus, the present embodiment of the present invention provides a method for readily and quickly detecting and identifying degradation of the network. The performance statistics also provide the information needed to enable the network manager to compare network performance against the metrics specified in the service level agreement. The performance statistics also permit the network manager to perform active troubleshooting to determine the source of any network degradation in addition to the monitoring function.

With reference now to step 1056 of FIG. 10, in the present embodiment the performance statistics are reported to a central computer system. In one embodiment, the performance statistics are periodically and automatically reported to the central computer system from each client computer system on the communication network at a programmable interval of time, e.g., every 30 minutes, although it is appreciated that other intervals of time can be specified in accordance with the present invention. (Performance statistics are reported to the central computer system as described in the application filed concurrently with the instant application, assigned to the assignee of the present invention, "Integrated Computer System and Network Performance Monitoring," Richard A. Fletcher, Prakash C. Banthia and Amanda Svensson, Ser. No. 09/143,486.)

With reference now to FIG. 3, it is appreciated that accordance with the present invention, application response time may also be readily determined using the protocol "heartbeat" data packets that are routinely generated in protocol stack 320 of client computer system 300 and transmitted to protocol stack 370 of server computer system 350, and vice versa. The purposes of such well-known heartbeat data packets are to enable the computer systems to determine that a communication link exists between the computer systems and to indicate if the link is broken. The heartbeat data packets do not pass into the application layer of the computer systems. Thus, application response time can be determined by using the time-stamps applied at the layered service provider while the round trip of heartbeat data packets are time-stamped and measured at the protocol stack level.

Figure 11:
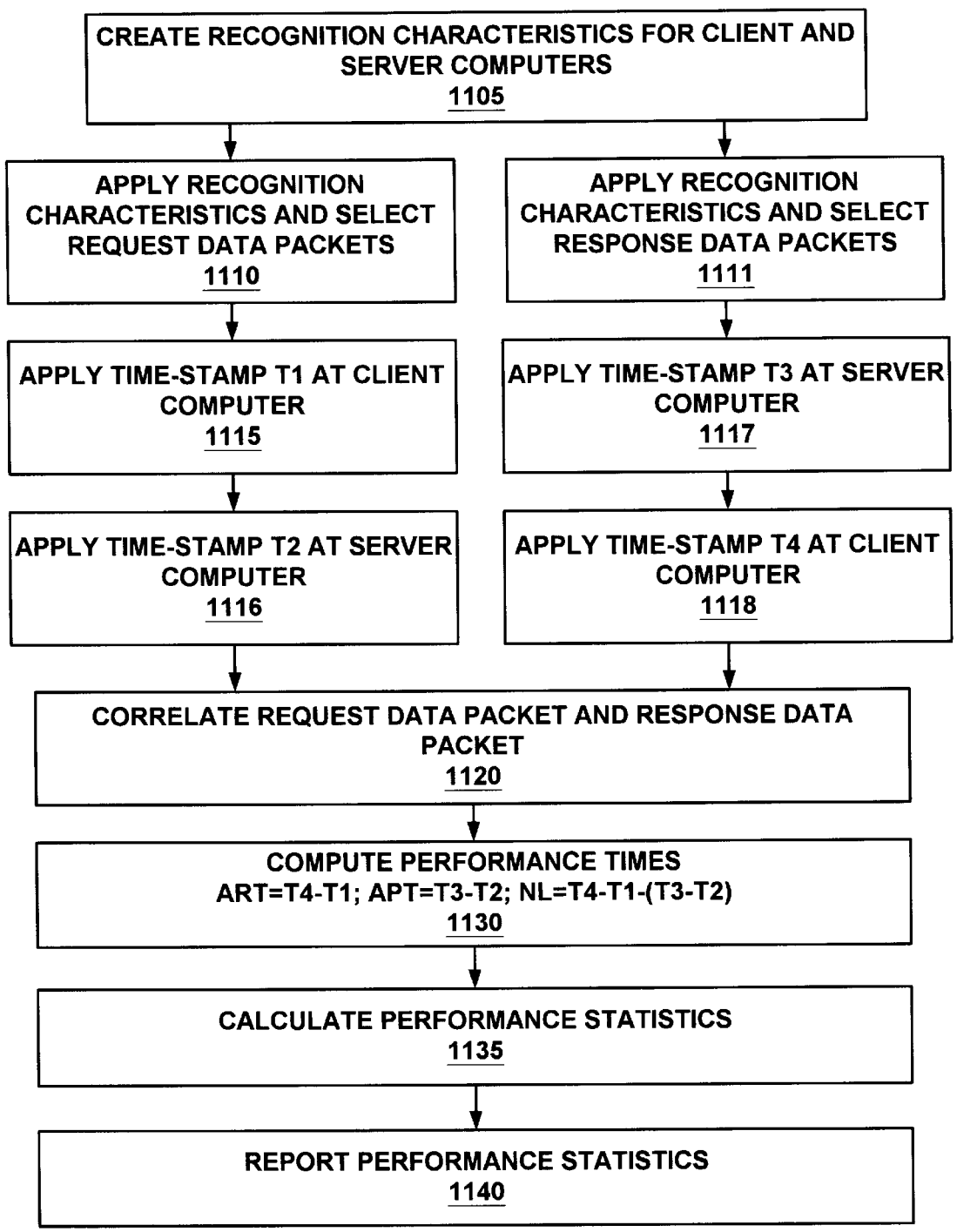
FIG. 11 is a diagram exemplifying steps of a method employed to determine performance statistics in accordance with one embodiment of the present invention.

With reference now to FIG. 11, and also to FIG. 3, an example illustrating the application of one embodiment of the present invention to request and response data packets is provided. With reference to step 1105, in this embodiment the network manager defines recognition characteristics 505 (FIG. 5) for client computer system 300 and for server computer system 350 as previously described. In steps 1110 and 1111, the recognition characteristics are applied to select data packets sent by one or the other of the computer systems. In steps 1115, 1116, 1117 and 1118, in this embodiment time-stamps T1, T2, T3 and T4 are applied to request and response data packets 390 and 395 at the end-node computer systems; that is, time-stamps T1 and T4 are applied at client computer system 300, and time-stamps T2 and T3 are applied at server computer system 395. Thus, in the present invention the time-stamps provide an accurate measure of when the data packets are transmitted and received by each of the computer systems in the computer network. Alternatively, in another embodiment time-stamps T1, T2, T3 and T4 are applied at the layered service provider to the socket calls corresponding to request and response data packets 390 and 395.

Continuing with reference to FIG. 11, in step 1120 this embodiment of the present invention correlates a response data packet from the server computer system to the request data packet from the client computer system that prompted the response, as described previously. Alternatively, in another embodiment the corresponding send and receive socket calls are correlated.

With reference still to FIG. 11 and also to FIG. 3, in step 1130 the present invention determines performance time based on the time-stamps of each pair of correlated data packets in one embodiment, or each pair of correlated socket calls in another embodiment. The application response time is determined by computing the difference between time-stamps T4 and T1. The application processing time is determined by computing the difference between time-stamps T3 and T2. The network latency from client computer system 300 to server computer system 350 and vice versa is determined by computing the difference between time-stamps T4 and T1, and then subtracting the difference between time-stamps T3 and T2. The protocol latency is determined by computing the difference between each of time-stamps T1, T2, T3 and T4 and a corresponding time-stamp applied by the computer system at the bottom of protocol stacks 320 and 370.

With reference back to FIG. 11, in step 1135, the present invention calculates performance statistics based on the application response time, application processing time, network latency and protocol latency for a plurality of correlated data packets in one embodiment, or the corresponding socket calls in another embodiment. For example, the average, median, maximum and minimum application response times are determined for the set of correlated data packets collected for a specified network application over the specified time interval. In step 1140 of the present embodiment, the performance statistics are reported to a central computer system.

In summary, the present invention computes performance statistics for the application response time, application processing time, network latency and protocol latency for a plurality of network applications, and reports the performance statistics to the network manager at a prescribed interval. In one embodiment the present invention also computes file transfer rate. The present invention thus provides a method for monitoring a computer system communication network that readily and quickly detects and identifies degradation of the network. The present invention described herein measures performance time at the layered service provider of end-user computer systems and thus provides an accurate measure of the performance and reliability of the network. The performance statistics generated by the present invention can be used to measure the performance of the network against the provisions of a governing service level agreement. The present invention layered service provider monitors performance statistics from a position prior to where the data packets are encrypted, and so it can be applied to a network that utilizes encrypted data packets. The present invention layered service provider does not interfere with the processing of the network applications.

Identification of Application Information

Figure 12:
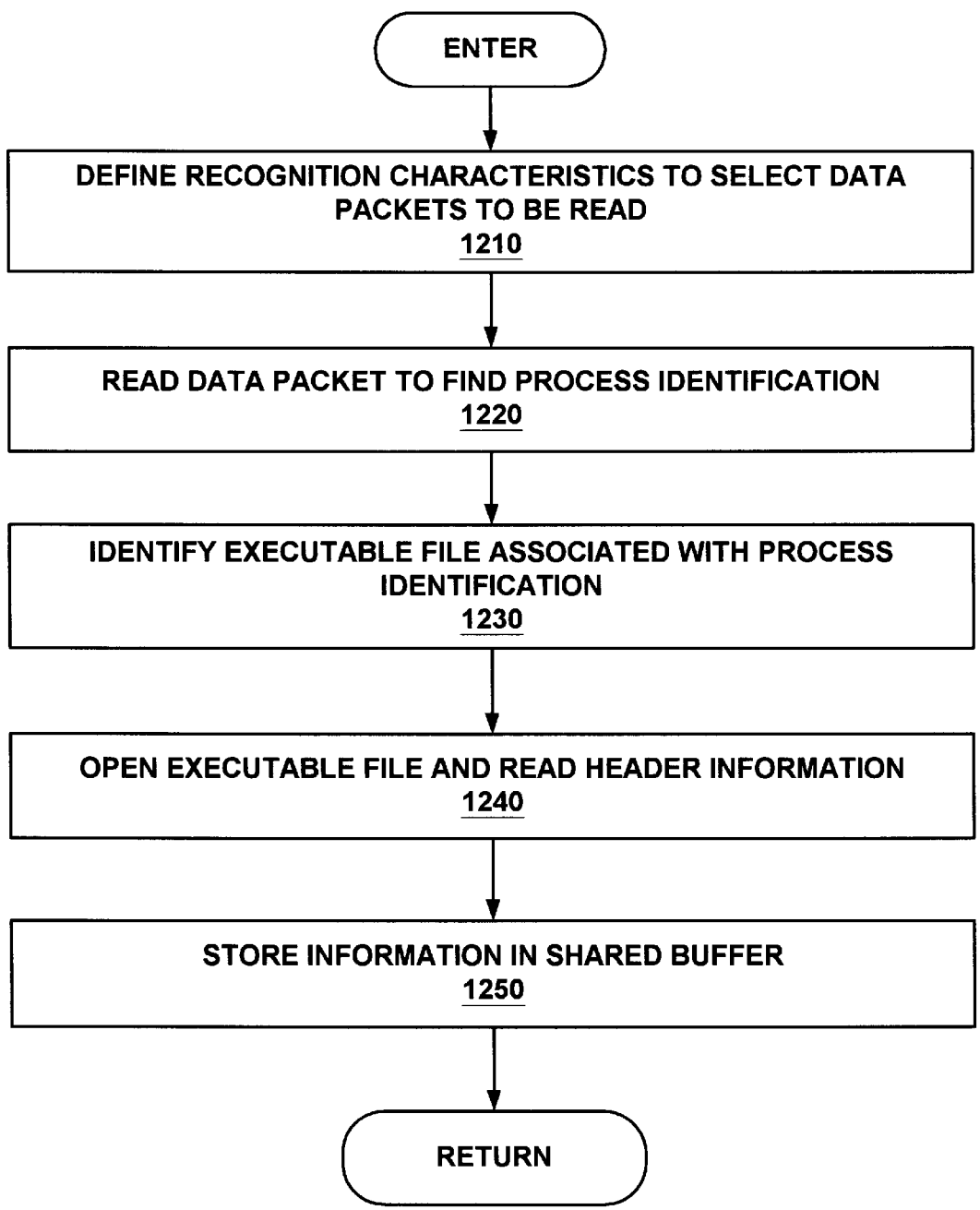
FIG. 12 is a flow chart of a process for identifying application information accordance with one embodiment of the present invention.

FIG. 12 illustrates a process 1200 for identifying information associated with a network application, where process 1200 is implemented as program instructions stored in computer-readable memory units of in an end-node computer system such as client computer system 300 (FIG. 3) and executed by central processor 201 (FIG. 2), and can also be stored and executed on server computer system 350 (FIG. 3). Process 1200 is implemented via present invention layered service provider 430 of FIG. 4. As presented above, the present invention layered service provider 430 is uniquely and advantageously located between the application program interface and the protocol stack in a computer system, and thus may observe all data packets associated with a network application. Also, the present invention layered service provider 430 is located in a position prior to encryption of the information in the data packets, so that the information in the data packets can be read in the clear.

With reference to FIG. 12, a request data packet (e.g., request data packet 390 of FIG. 3) is created when a computer system user requests that a particular network application (e.g., network application 410c of FIG. 4) be performed. As noted above, all data packets are observed by layered service provider 430. In step 1210, in one embodiment, recognition characteristics (e.g., recognition characteristics 505 of FIG. 5) may be defined to enable the network manager to focus on a particular type of data packet. Data packets containing a network application "not well known"—that is, a network application not identified according to a standard port identification number—are captured by process 1200, as well as known network applications. In step 1210, request data packets 390 that are to be read in step 1220 are thus selected.

With reference to FIG. 12, in step 1220 of one embodiment, the data contained in request data packet 390 is read by layered service provider 430, and the unique process identification associated with network application 410c is determined from the data in the data packet. In step 1230 of the present embodiment, the process identification from step 1220 is used to identify the name of the executable memory unit location (e.g., an executable file) associated with network application 410c. In step 1240, the data within the executable memory unit location, specifically the information typically contained in the header of the executable memory unit location, provide application information such as the name, version number, and the like for the exemplary network application 410c. The application information provided in the header of the executable memory unit location may consist of information presented in either "fixed" fields or "string" fields.

In another embodiment, the request for a network application results in a socket call being generated. Associated with the socket call is a process identification. As described above, in this embodiment, the process identification from the socket call is used to identify the name of the executable memory unit location (e.g., an executable file) associated with the network application (e.g., network application 410c). The data within the executable memory unit location, specifically the information contained in the header of the executable memory unit location, provide information regarding the network application as described above.

In step 1250 of FIG. 12, the information read from the header of the executable memory unit location is written to and stored in shared buffer 435 of FIG. 5, specifically version buffer 574, from which it can be accessed and utilized by the network manager from a central computer system. As explained above, shared buffer 435, including version buffer 574, can be written to and read from both application layer 310 and kernel layer 330 of a computer system in accordance with the present invention. In an encrypted network environment in which a request data packet 390 is encrypted, the data contained within request data packet 390 cannot be deciphered. However, the information in version buffer 574 is used in accordance with the present invention to correlate the unencrypted version of request data packet 390 to the encrypted version. Thus, it is possible for the network manager to determine the network application associated with an encrypted data packet, and to handle the encrypted network application accordingly. For example, the encrypted network application can be prioritized in accordance with the prioritization standards established by IEEE and IETF. Additional information is provided below—refer to "Support for Encrypted Data Packets" herein.

In this manner, process 1200 in the present embodiment of the present invention is able to determine the application information required by the network manager to identify specific network applications, even if the application is not using a standard port identification number or is using a port identification number belonging to another network application. The present invention provides application information needed by the network manager to monitor and measure network performance, as well as the information needed to prioritize network applications according to IEEE and IETF standards. The present invention, because of its location within an end-node computer, is able to obtain the desired application information prior to encryption of the information. The present invention accomplishes the above without interfering with the processing of the network application.

Support for Encrypted Data Packets

Figure 13:
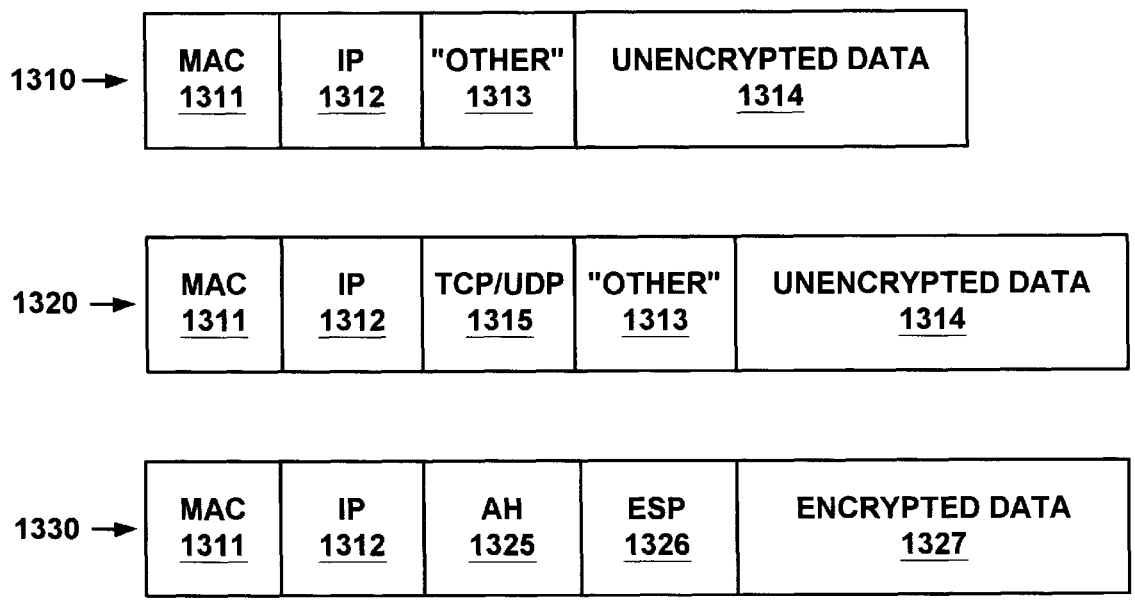
FIG. 13 is an illustration exemplifying the data fields in a data packet upon which one embodiment of the present invention may be practiced.

Refer now to FIG. 13, which exemplifies the data fields contained within an unencrypted version and an encrypted version of a data packet (e.g., request data packet 390 of FIG. 3) corresponding to a network application request issued by a user on a client computer system (e.g., client computer system 300 of FIG. 3). Data packet 1310 is unencrypted and contains specified data fields such as those typified by FIG. 13, including MAC (medium access control) 1311, IP (internet protocol) 1312, "other" data 1313 that typically includes port identification and the like, and unencrypted data 1314. The fields corresponding to the contents of data packet 1310 are logically organized and formatted in data fields according to a known standard. The present invention layered service provider (e.g., layered service provider 430 of FIG. 4) resides in a location in computer system 300 where it is able to observe unencrypted data packet 1310, and thus layered service provider 430 is able to read the contents of data packet 1310.

Continuing with reference to FIG. 13, as data packet 1310 passes through the protocol stack (e.g., protocol stack 320 of FIG. 3), additional data are added to the data packet in a logical format according a known standard. Hence, data packet 1320 incorporates TCP (Transmission Control Protocol) 1312 in addition to the other fields identified above for data packet 1310 when data packet 1320 exits protocol stack 320. Data packet 1320 is also unencrypted.

With reference still to FIG. 13, data packet 1330 is encrypted by an encryption module (e.g., encryption services 440 of FIG. 4) and thus contains encrypted data 1327 that are not in the clear and cannot be read. TCP/UDP (Universal Datagram Protocol) 1315 and "other" data 1313 are also encrypted and cannot be read. The encryption module adds AH (authentication header) 1325 and ESP (encryption service protocol) 1326 to data packet 1330. AH 1325 and ESP 1326 are unique to encrypted data packet 1330. The data in encrypted data packet 1330 are contained in fields that are logically organized in accordance with a known standard, typified by the IPSec standard developed by the IETF.

Figure 14:
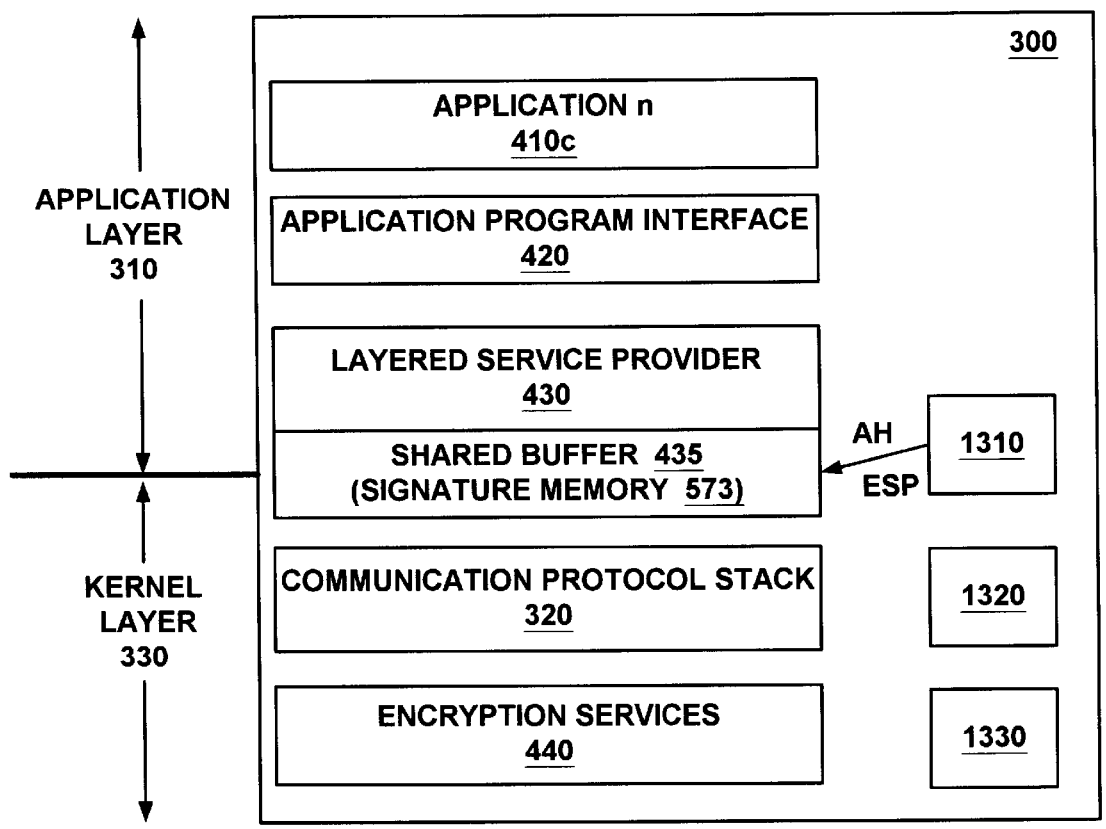
FIG. 14 is an illustration of the arrangement of memory units in a computer system in accordance with one embodiment of the present invention.

With reference now to FIG. 14, unencrypted data packet 1310 resides in application layer 310 of client computer system 300. Unencrypted data packet 1320 resides in protocol stack 320 and is thus in kernel layer 330 of client computer system 300. Encrypted data packet 1330 resides in kernel layer 330 of client computer system 300. Layered service provider 430 resides in application layer 310. As previously discussed, shared buffer 435 is both read-accessible and write-accessible from both application layer 310 and kernel layer 330. In other words, data may be read from and written to shared buffer 435 from both application layer 310 and kernel layer 330.

Figure 15:
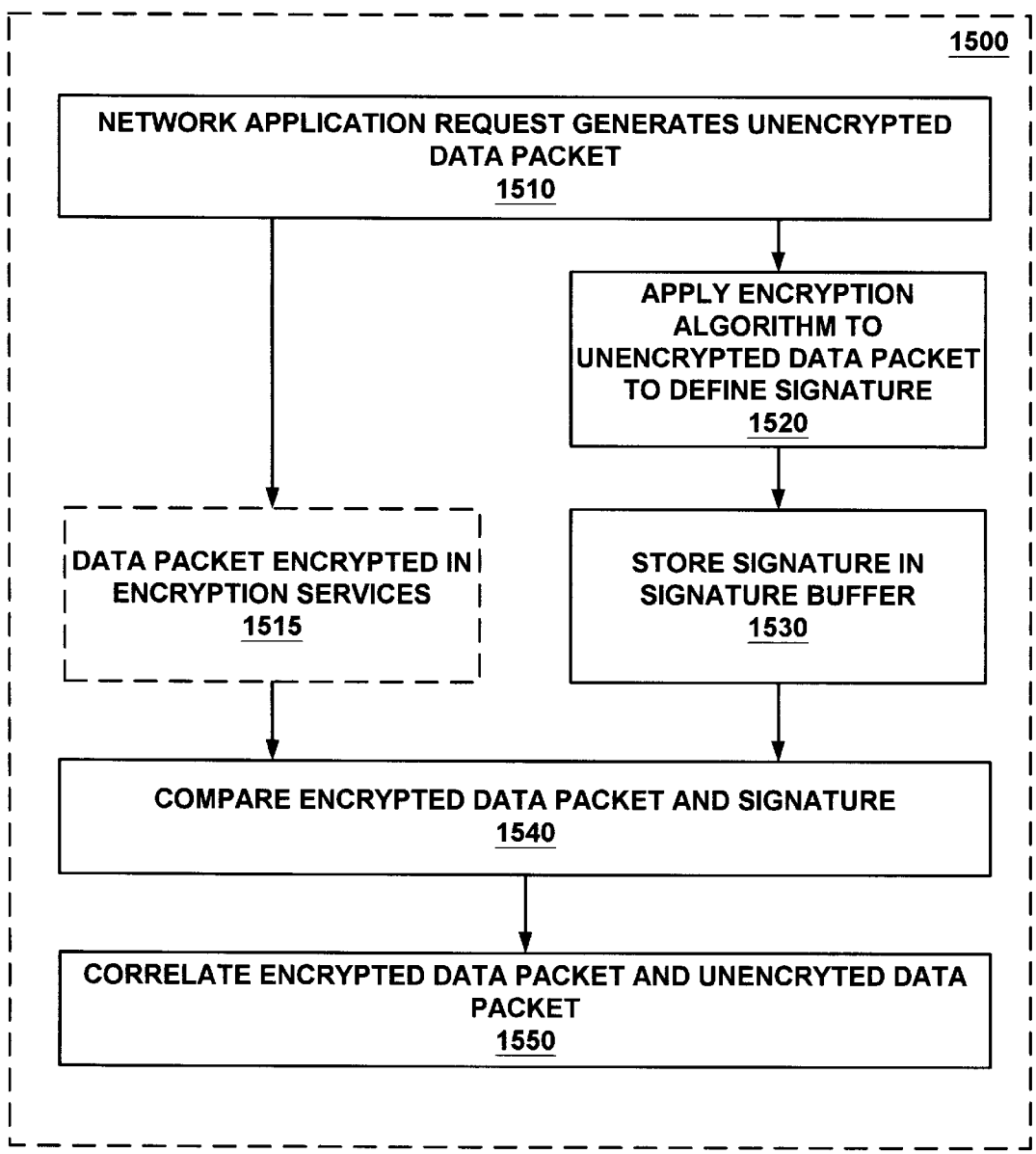
FIG. 15 is an illustration of a process for monitoring encrypted data packets in accordance with one embodiment of the present invention.

FIG. 15 illustrates a process 1500 for correlating an encrypted data packet and an unencrypted version of the data packet. Process 1500 is implemented as program instructions stored in computer-readable memory units of an end-node computer system such as client computer system 300 (FIG. 3) and executed by central processor 201 (FIG. 2), and also stored and executed on server computer system 350 (FIG. 3). Process 1500 is implemented via the present invention layered service provider 430 of FIG. 4.

In step 1510, a user of client computer system 300 of FIG. 3 issues a request for a network application (e.g., application 410c of FIG. 4) which in turn generates a request data packet (e.g., request data packet 390 of FIG. 3). In an encrypted network environment, in step 1515 request data packet 390 is encrypted by an encryption process in encryption services 440 of FIG. 4 before request data packet is 390 is transmitted from client computer system 300 through the network. The encryption process applied in encryption services 440 is a known process according to the IETF standard.

In step 1520 of FIG. 15, in accordance with the present embodiment of the present invention, the encryption process utilized by encryption services 440 along with the network addresses and transport port identifiers is also applied by layered service provider 430 to unencrypted data packet 1310 to create a signature. In this embodiment, the signature generated by the encryption process applied in step 1520 creates the same ESP, authentication header AH, network address and transport port identifier that are included in encrypted data packet 1330.

In step 1530 of FIG. 15, in the present embodiment, the signature generated in step 1520 is stored in signature buffer 573 within shared buffer 435 of FIG. 5. Shared buffer 435, including signature buffer 573, can be written to and read from both application layer 310 and kernel layer 330 of a computer system in accordance with the present invention. Thus, in step 1540, the present embodiment has the capability to compare the signature generated in step 1520 to encrypted data packet 1330. The signature from step 1520 is analogous to a filter, and thus in this embodiment layered service provider 430 generates a filter in application layer 310 that is applied in kernel layer 330. The data in the AH and ESP data fields of the signature in signature buffer 573 as well as the network address and transport port identifier are compared to AH 1325, ESP 1326, network address and transport port identifier of encrypted data packet 1330. Because these are unique for each signature and for each encrypted data packet, a match of these data fields thereby correlates encrypted data packet 1330 to unencrypted data packets 1310 and 1320.

In one embodiment, a copy of unencrypted data packet 1310 is stored in shared buffer 573. Thus, a copy of the network application request exists in the clear and can be read and monitored by persons authorized to do so.

Thus, by correlating an encrypted data packet with an unencrypted data packet, the present embodiment enables the network manager to monitor the encrypted data packet. That is, application information can be determined for the encrypted data packet by utilizing process 900 of FIG. 9, by applying this process to the correlated unencrypted data packet. Similarly, performance measurements can be obtained for an encrypted data packet utilizing processes 900 and 1000 of FIGS. 9 and 10, respectively. Therefore, in accordance with the present invention, it is possible for a network manager to interpret performance statistics according to the network application being utilized, and is also able to prioritize encrypted network applications in accordance with the prioritization standards established by IEEE and IETF. The network manager is also able to demonstrate compliance with the provisions of the governing SLA. Also, the present invention permits network management tools in addition to those described above to be applied to monitor network applications in an encrypted environment. Thus, the present invention addresses the disadvantages associated with the prior art regarding monitoring network performance in an encrypted environment.

The preferred embodiment of the present invention, a method for analyzing network applications in an encrypted environment, is thus described. While the present invention has been described in particular embodiments, it should be appreciated that the present invention should not be construed as limited by such embodiments, but rather construed according to the following claims.

What is claimed is:

1. In a communication network comprising computer systems communicatively coupled with communication equipment, said computer systems executing network applications that send and receive data packets over said communication network, a method for quantifying performance of said communication network comprising the steps of:

a) executing a process for identifying network applications that originated request data packets and response data packets, wherein a response data packet is an acknowledgment and sent in response to a request data packet, said step a) performed between an application program interface and a protocol stack in a computer system, wherein said application program interface resides in an application layer of said computer system and said protocol stack resides in a kernel layer of said computer system;

b) applying time-stamps when request data packets and response data packets are between said application program interface and said protocol stack of said computer system and storing said time-stamps in a memory unit within said computer system, wherein said memory unit is read-accessible and write-accessible from said application layer and from said kernel layer of said computer system;

c) computing a difference between a first time-stamp and a second time-stamp;

d) calculating performance statistics measured on said difference and storing said performance statistics in said memory unit; and e) communicating said performance statistics to a central computer system.

2. The method as recited in claim 1 wherein step a) comprises the steps of:

defining recognition characteristics for identifying said network applications; and applying said recognition characteristics to said request data packets and to said response data packets to recognize a request data packet and a response data packet as corresponding to a particular network application.

3. The method as recited in claim 2 wherein said recognition characteristics are implemented by a filter.

4. The method as recited in claim 1 wherein step a) is implemented by said network application causing said application program interface to generate a socket call corresponding to a request data packet and a socket call corresponding to a response data packet, said socket calls identifying a particular network application.

5. The method as recited in claim 4 wherein said performance statistics measure application response time and wherein step b) comprises the steps of:

applying a first time-stamp to said socket call corresponding to said request data packet, said request data packet being sent by a first computer system to a second computer system; and applying a second time-stamp to said socket call corresponding to said response data packet, said response data packet being received by said first computer from said second computer system, said first computer being a client computer system and said second computer system being a server computer system.

6. The method as recited in claim 4 wherein said performance statistics measure application processing time and wherein step b) comprises the steps of:

applying a first time-stamp to said socket call corresponding to said request data packet, said request data packet being received by a second computer system from a first computer system; and applying a second time-stamp to said socket call corresponding to said response data packet, said response data packet being sent by said second computer system to said first computer system, said first computer system being a client computer system and said second computer system being a server computer system.

7. The method as recited in claim 4 wherein said performance statistics measure protocol latency and wherein step b) comprises the steps of:

applying a first time-stamp to a socket call corresponding to data packet when said data packet is between said application program interface and said protocol stack of a computer system; and applying a second time-stamp to a socket call when said data packet is at a bottom of said protocol stack of a computer system.

8. The method as recited in claim 1 wherein said performance statistics measure application response time and wherein step b) comprises the steps of:

applying a first time-stamp to a request data packet, said request data packet being sent by a first computer system to a second computer system; and applying a second time-stamp to a response data packet, said response data packet being received by said first computer from said second computer system, said first computer being a client computer system and said second computer system being a server computer system.

9. The method as recited in claim 1 wherein said performance statistics measure application processing time and wherein step b) comprises the steps of:

applying a first time-stamp to a request data packet, said request data packet being received by a second computer system from a first computer system; and applying a second time-stamp to a response data packet, said response data packet being sent by said second computer system to said first computer system, said first computer system being a client computer system and said second computer system being a server computer system.

10. The method as recited in claim 1 wherein said performance statistics measure protocol latency and wherein step b) comprises the steps of:

applying a first time-stamp to a data packet when said data packet is between said application program interface and said protocol stack of a computer system; and applying a second time-stamp when said data packet is at a bottom of said protocol stack of a computer system.

11. In a communication network comprising computer systems communicatively coupled with communication equipment, said computer systems executing network applications that send and receive data packets over said communication network, a method for identifying application information corresponding to a network application comprising the steps of:

a) identifying an executable memory location within a computer system where said application information is stored, said step a) performed between an application program interface and a protocol stack in said computer system, wherein said application program interface resides in an application layer of said computer system and said protocol stack resides in a kernel layer of said computer system;

b) reading said application information from said executable memory unit location;

c) storing said application information in a memory unit of said computer system, wherein said memory unit is read-accessible and write-accessible from said application layer and from said kernel layer of said computer system; and d) reporting said application information to a central computer system.

12. The method as recited in claim 11 wherein step a) comprises the step of reading data from a data packet originated by said network application, said data identifying said executable memory location.

13. The method as recited in claim 11 wherein step a) comprises the step of reading data from a socket call, said socket call generated by said application program interface in response to said network application.

14. A computer system comprising:

a processor coupled to a bus; and a first memory unit coupled to said bus, said first memory unit having an application layer and a kernel layer, and said first memory unit having stored therein instructions that when executed by said processor implement a method for quantifying performance of a communication network having computer systems communicatively coupled to each other, said computer systems executing network applications that send and receive data packets over said communication network, said method comprising the steps of:

a) executing a process for identifying network applications that originated request data packets and response data packets, wherein a response data packet is an acknowledgment and sent in response to a request data packet, said step a) performed between an application program interface and a protocol stack in said computer system, wherein said application program interface resides in said application layer of said computer system and said protocol stack resides in said kernel layer of said computer system;

b) applying time-stamps when request data packets and response data packets are between said application program interface and said protocol stack of said computer system and storing said time-stamps in a second memory unit within said computer system, wherein said second memory unit is read-accessible and write-accessible from said application layer and from said kernel layer of said computer system;

c) computing a difference between a first time-stamp and a second time-stamp;

d) calculating performance statistics measured on said difference and storing said performance statistics in said second memory unit; and e) communicating said performance statistics to a central computer system.

15. The computer system of claim 14 wherein said method further comprises the step of identifying application information corresponding to said network application, said step of identifying application information corresponding to said network application comprising the steps of:

between said application program interface and said protocol stack in said computer system, identifying an executable memory location within said computer system where said application information is stored;

reading said application information from said executable memory unit location;

storing said application information in said second memory unit of said computer system; and reporting said application information to a central computer system.

* * * * *